March 10, 1936.  R. L. PETTEFER  2,033,446
ELECTRIC TREATER WITH DIVERGING STREAM AND METHOD
Filed July 7, 1934  2 Sheets-Sheet 1
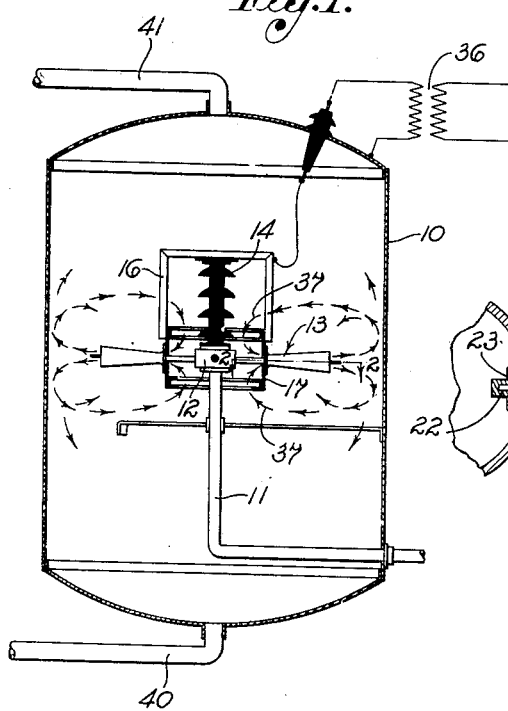
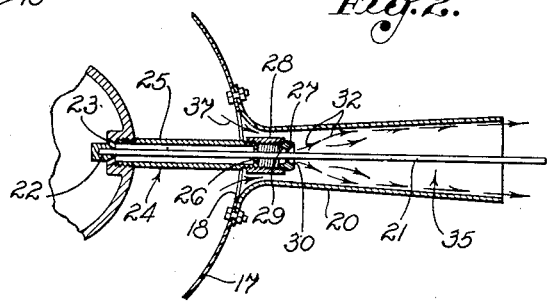
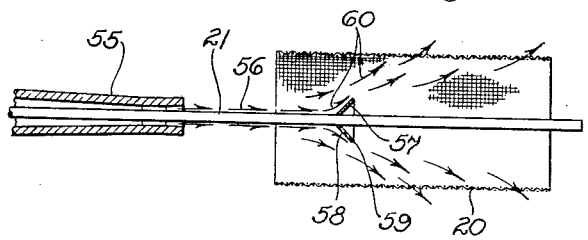
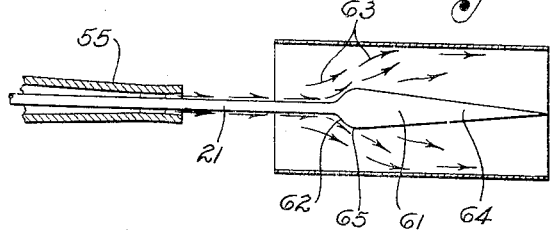
INVENTOR
ROBERT L. PETTEFER
BY Fred W Lawin
ATTORNEY.

March 10, 1936. R. L. PETTEFER 2,033,446
ELECTRIC TREATER WITH DIVERGING STREAM AND METHOD
Filed July 7, 1934 2 Sheets-Sheet 2
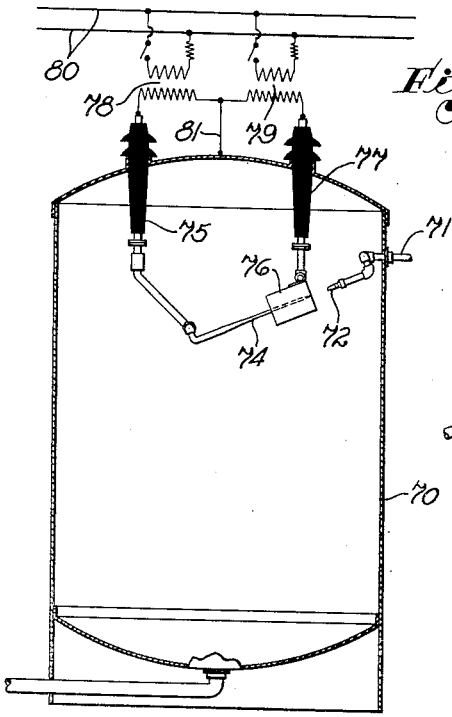
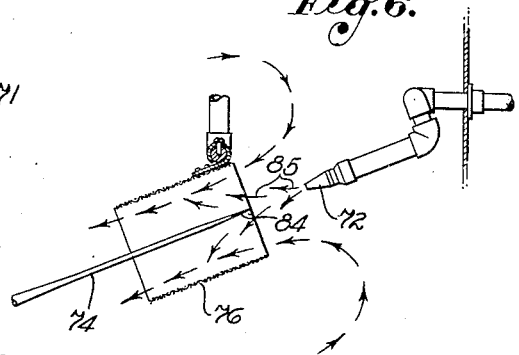
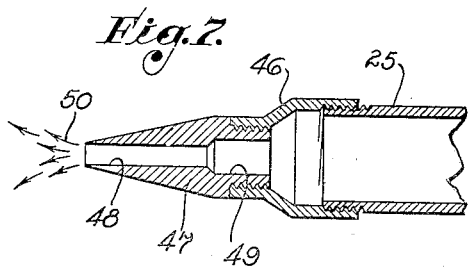
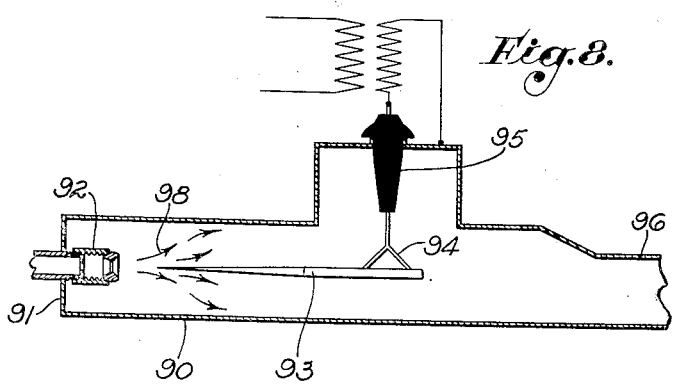
INVENTOR
ROBERT L. PETTEFER
BY
ATTORNEY.

Patented Mar. 10, 1936

2,033,446

UNITED STATES PATENT OFFICE 2,033,446

ELECTRIC TREATER WITH DIVERGING STREAM AND METHOD

Robert L. Pettefer, Long Beach, Calif., assignor to Petroleum Rectifying Company of California, Los Angeles, Calif., a corporation of California Application July 7, 1934, Serial No. 734,097

10 Claims. (Cl. 204—24)

My invention relates to the electric treatment of liquids, and is of particular utility in separating materials from liquids by the use of an electric field. One very important use of the present invention is in the treatment of emulsions, it being desirable to coalesce the dispersed phase of the emulsion into particles of larger size so that subsequent separation can be effected. It is in this capacity that the invention will be particularly described, though it will be clear that the invention can also be used for the electrical treatment of other liquids.

In the patent to Fisher, No. 1,838,924, there is disclosed an electric dehydrator utilizing concentric inner and outer electrodes. The system therein shown comprehends the introduction of an envelope of emulsion around the central electrode so that this emulsion is introduced into the most intense portion of the treating field. The patentee points out the desirability of maintaining this emulsion in the most intense portion of the field, and of preventing the spreading of this emulsion into contact with the outer electrode. The electrodes are so designed as to accomplish this end, and the surface of the central electrode is formed of a material having an affinity for the emulsion so that the emulsion will cling thereto. In addition, a stream of a dielectric liquid is moved through the outer portion of the treating space so that this treating space contains concentric but well defined streams of emulsion and dielectric liquid. Such a system is entirely successful in dehydrating many petroleum emulsions, especially if the water content of these emulsions is relatively high.

While the treatment by the use of concentric streams of emulsion and dielectric liquid effects successful coalescence of the dispersed phase, I have found that the water content of certain emulsions can be further decreased by purposely causing the emulsion to diverge from the zone immediately around the central electrode, this divergence being carried to such a point that emulsion particles actually move outward and into contact with the outer electrode. While previously pipe-line requirements permitted the presence of 3% of water in the treated oil, present-day requirements are often much more strict, and the industry is often demanding treated oil containing less than 1% of water. I have found that in many instances lower cuts can be obtained on certain emulsions if the emulsion is not confined to the most intense portion of the field, but is purposely caused to diverge.

It is an object of the present invention to provide a method and apparatus for treating emulsions and the like in which the material to be treated is introduced into the most intense portion of the field, but is caused to diverge in the field to move toward the outer electrode.

It is a further object of the present invention to utilize an outer electrode in the form of a sleeve, and to use a diverging-stream nozzle for introducing the emulsion into this electrode so that the emulsion diverges to such an extent that the emulsion particles come into contact with this sleeve electrode.

In other instances I have found it desirable to establish fields both inside and outside of an interstitial sleeve electrode, so that the diverging emulsion stream forces emulsion particles not only into the vicinity of the sleeve electrode, but actually through the interstices thereof and thus into the field formed outside the sleeve electrode, and it is an object of the invention to provide a novel method and apparatus for accomplishing this result.

Further objects of the invention lie in the constructional details of the nozzles for effecting this diverging stream.

While the use of nozzles giving diverging streams is very satisfactory, I have in some instances found it possible and desirable to use auxiliary means for spreading the incoming emulsion. Conventional nozzles of the "fire-hose" type can thus be used in conjunction with means on the central electrode and in the path of this emulsion for spreading the emulsion so that it moves toward the outer or sleeve electrode, and it is an object of the present invention to provide on the central electrode an improved structure which deflects the incoming emulsion stream, the copending application of Gordon B. Hanson and Harold C. Eddy, Serial No. 602,746, filed April 2, 1932, entitled Multiple electrode treater and method, containing broad claims on this feature.

Contrary to previous concepts I have found that if the water content of the emulsion is not too high, it is not necessary to use a stream of dielectric liquid. Thus, many emulsions having a water content of 20% or less can be successfully treated without such a flow of dielectric liquid, and in some instances emulsions of even higher water content can be treated without marked short-circuiting tendency, even though the diverging stream forces emulsion particles from the vicinity of one electrode into the vicinity of the other. However, emulsions having a large amount of water associated therewith are usually best treated by the present process and apparatus if a dielectric liquid is supplied to the treating space, it being understood that this dielectric liquid may be any liquid having a higher dielectric strength than the emulsion undergoing treatment.

In utilizing such a dielectric liquid, I have found it very desirable to effect a mixing of this liquid and the emulsion during the time that these liquids are in the electric field, and it is an object of the present invention to provide a method and apparatus for accomplishing this result.

It is a further object of the invention to provide a novel mixing means for mixing a dielectric liquid and the emulsion undergoing treatment, this mixing means including a diverging-stream nozzle.

Further objects and advantages of the invention will be made evident hereinafter.

Several embodiments of the invention are shown in the accompanying drawings. Referring to these drawings, Fig. 1 illustrates one type of treater, partially in section.

Fig. 2 is a sectional view taken on the line 2—2 of Fig. 1.

Figs. 3 and 4 illustrate alternative systems for obtaining a diverging stream of the incoming emulsion.

Fig. 5 is a sectional view of another form of treater incorporating the features of the present invention.

Fig. 6 is an enlarged view of a portion of the treater shown in Fig. 5.

Fig. 7 illustrates an alternative form of diverging-stream nozzle.

Fig. 8 is a sectional view of another form of treater utilizing the principles of the present invention.

Referring particularly to Fig. 1, the commercial type of treater therein shown includes a tank 10 into which the emulsion is introduced through a pipe 11. A head 12 secured to the upper end of this pipe distributes the emulsion to one or more treating units 13. One of these units is illustrated in Fig. 2. The head 12 also supports an insulator means 14 which in turn supports a frame 16 to which is secured a drum 17.

Openings 18 are provided in the drums 17, each opening communicating with the interior of an outer or sleeve electrode 20. An inner or rod electrode 21 extends centrally in the electrode 20 and may be secured to the head 12, as indicated by the numeral 22. The incoming emulsion flows from the head 12 through openings 23 and into a nozzle structure 24 of special construction, it being possible to use any type of nozzle structure which produces a diverging stream of the emulsion. In the form shown in Fig. 2, this nozzle structure includes a nipple 25 having a restricted opening 26 at its outermost end and includes an orifice member 27 secured to the nipple 25 as by a coupling 28. This orifice member 27 is shown as including a converging rear face 29 and a diverging front face 30 so that the emulsion moving from the nozzle structure 24 diverges as it is discharged from the orifice member 27, this diverging flow being indicated by the arrows 32.

In the operation of this form of the invention the tank 10 preferably contains a body of dielectric liquid of higher dielectric strength than the emulsion to be treated. Electric fields are established in the treating spaces defined between the sleeve electrode 20 and the rod electrode 21, a typical treating space being indicated by the numeral 35 of Fig. 2. Any suitable high-potential source may be utilized for setting up these fields, the source in Fig. 1 being illustrated as comprising a transformer 36. The diverging emulsion stream moving from the orifice member 27 draws a portion of the dielectric liquid into the outer or peripheral portion of the sleeve electrode 20, as indicated by the arrows 37. This stream of dielectric liquid is mixed with the emulsion flowing from the orifice member 27 due to the diverging or spreading action. It is usually preferable to utilize a nozzle means 24 which diverges the stream to such an extent that emulsion particles will move outward from the rod electrode 21 and into contact with the sleeve electrode 20. The result of such a diverging stream is not only to increase the treating efficiency of many emulsions, but also to intimately mix the emulsion with the dielectric liquid moving as indicated by the arrows 37. This type of treater equipped with a diverging-stream nozzle is capable of handling certain emulsions having a very high water content, an emulsion containing 60% water being very successfully treated.

The water particles in the diverging emulsion stream are coalesced into larger masses by the action of the electric field. I have found it preferable not to attempt to effect separation of the oil and water in the field, but to use this field only to coalesce. The treated emulsion moves outward from the sleeve electrode 20 and is subjected to gravitational separation in the tank 10, the water moving to the bottom of the tank and being withdrawn through the pipe 40 and the oil being drawn to the top of the tank and being withdrawn through a pipe 41. In this connection the treated oil itself will serve as the dielectric liquid which is circulating as indicated by the arrows 37.

It should be clear that various types of diverging-stream nozzles may be used, the form shown in Fig. 1 being only illustrative, though one which has been found to be very successful. Another type of diverging-stream nozzle which can be very satisfactorily used is illustrated in Fig. 7. Here a nipple 25 is threaded to a reduction coupling 46, this coupling carrying an orifice member 47 providing a cylindrical bore 48 and a counterbore 49. Turbulence in such a nozzle construction causes the emulsion to spread or diverge as it leaves the bore 48, the direction of movement of the emulsion being indicated by the arrows 50. Other types of diverging-stream nozzles are well-known in the art and can be used in place of the nozzle structures shown in Figs. 2 and 7.

Another way of producing such a diverging stream of emulsion is illustrated in Fig. 3. Here the rod electrode 21 extends into a nozzle 55 which need not be designed to itself form a diverging stream. Conventional nozzles such as are at present used on dehydrators such as shown in Fig. 1 can be used in this form of the invention, or any type of nozzle can be used, which, in the absence of auxiliary factors, would throw a stream of the emulsion entirely through the sleeve electrode without spreading of this stream to such an extent as to permit the water particles to come in contact with the sleeve electrode. With such a nozzle the emulsion will flow along and in contact with the rod electrode 21, as indicated by the arrows 56. At some point in this flow it is desirable to provide means on the rod electrode 21 for spreading the emulsion to move this emulsion away from the surface of the rod electrode. In the form shown in Fig. 3 this means takes the form of a projection or button 57 suitably secured to the rod electrode and providing a diverging surface 58 terminating in an edge 59. The angle of this diverging surface is not critical, though it has been found that the best results are obtained if the angle between this surface and the axis of the rod electrode 21 is approximately 45° or greater. The action of this projection is to deflect the stream of emulsion outward as indicated by the arrows 60.

So also, in Fig. 3 I have illustrated the outer or sleeve electrode 20 as being of an interstitial character, preferably being formed of screen. The result is that the outward flowing emulsion particles not only flow outward to a position adjacent the sleeve electrode, but actually move through the interstices thereof and thus from the field. In this connection it is often desirable to make the sleeve electrode 20 the live electrode so that a secondary field is set up between this sleeve electrode and the tank, the tank being usually grounded as indicated in Fig. 1. The emulsion flowing outward through the interstices of the sleeve electrode 20 is thus subjected to the action of this secondary field for further treatment. Such an external field also accelerates separation. It will be clear that such interstitial sleeve electrodes can be used in conjunction with the form of the invention shown in Figs. 1 and 2, and it will also be clear that the form of the invention shown in Fig. 3 is not limited in utility for use in conjunction with the interstitial outer electrode. A cylindrical imperforate electrode, such as shown in Fig. 4, can be used with good results.

In some instances there is a tendency for an excessively intense field to be formed between the edge 59 of the projection 57 and the sleeve electrode 20. In some emulsions this is not undesirable, but with other emulsions it is preferable to use a construction such as shown in Fig. 4. Here the projection 57 takes the form of a head 61 on the rod electrode 21 and provides a diverging surface 62 which guides the emulsion outward as indicated by the arrows 63. The forward end of the head 61 may conveniently be tapered as indicated by the numeral 64, though in some instances this is not essential. This head construction provides a rounded peripheral portion 65 in place of the edge 59 shown in Fig. 3 and thus decreases the tendency for the field to concentrate at this section.

In Fig. 5 I have illustrated another embodiment of the invention including a tank 70 and an intake pipe 71 extending therethrough. A diverging-stream nozzle 72 is used and may take the form of the nozzles shown in Figs. 2 or 7, for instance, or other well-known types of diverging-stream nozzles can be used. In this embodiment the rod electrode is indicated by the numeral 74 and is supported by a suitable bushing 75. The sleeve electrode is preferably, though not necessarily, formed of interstitial character and is indicated by the numeral 76, being supported by a bushing 77. Both the rod electrode 74 and the sleeve electrode 76 can be maintained at potentials above the tank 70 by means of a potential-supply system shown in Fig. 3. One method of accomplishing this result is to use two transformers 78 and 79, the primaries of these transformers being connected in parallel to a supply line 80, the secondaries of these transformers being connected in additive relation to the electrodes 74 and 76, a conductor 81 grounding the central portion of the double secondary, this conductor being also connected to the tank 70.

In this embodiment of the invention the rod electrode 74 is preferably pointed as indicated by the numeral 84. This sharp point extends in axial alignment with the diverging-stream nozzle 72, but does not extend into the discharge orifice thereof. This permits the rod 74 to comprise a live electrode, the nozzle 72 being grounded to the tank. In this form of the invention the rod electrode 74 may be made sufficiently pointed so as to readily pierce the diverging stream discharged from the nozzle 72. With the gradual taper as shown, however, this rod electrode will not materially assist in the spreading action, the diverging-stream nozzle itself being utilized to effect the divergence of the emulsion flowing as indicated by the arrows 85. The sleeve electrode 72 may be made interstitial, in which event the emulsion can flow outward into the interstices and into the field around this electrode. With the method of connection shown, a very high potential is established between the electrodes 74 and 76, while the field exterior of the electrode 76 is substantially lower, the potential between the tank 70 and the electrode 76 usually being one-half of the potential between the electrodes 74 and 76.

It should not be understood that the invention is limited to the use of a dielectric liquid. Thus, in Fig. 8 I have shown an apparatus which gives entirely satisfactory results, especially with emulsions which do not have an excessively large water content. Here the sleeve electrode is indicated by the numeral 90 and is closed at one end by a plate 91 through which extends a diverging-stream nozzle 92. The live electrode is in the form of a rod 93 suspended by a framework 94 retained by a bushing 95. A discharge pipe 96 conducts the treated constituents to a suitable settling tank or centrifugal separating means. The diverging stream thrown by the nozzle 92 is indicated by the arrows 98, and it has been found that the diverging character of this stream tends to eliminate the formation of short-circuiting paths between the electrodes.

It should be understood, however, that I am not limited to the use of the particular structures shown in carrying out my process wherein the emulsion particles are caused to move from one electrode to the other across the field, nor am I limited to the apparatus and embodiments shown, for various equivalent structures will be apparent to those skilled in the art.

I claim as my invention:

1. In combination in an electric treater for emulsions: a unitary sleeve electrode structure comprising a metallic member in the form of a sleeve; a rod electrode extending into said sleeve electrode structure and cooperating therewith in defining a treating space; a source of potential connected between said sleeve electrode and said rod electrode to establish an electric field therebetween, said field surrounding said rod electrode; and a diverging-stream nozzle into which said rod electrode extends, said nozzle and said rod cooperating in producing a diverging annular stream of emulsion which spreads toward said sleeve electrode structure immediately upon being expelled from said nozzle, said stream diverging in sufficient degree to move emulsion particles across said treating space and into contact with said sleeve electrode structure.

2. In combination in an electric treater for emulsions: a sleeve electrode; a rod electrode extending into said sleeve electrode and cooperating therewith in defining a treating space in which is established an electric field; an emulsion nozzle axially aligned with said rod electrode; and means on said rod electrode in said treating space and in the path of flow of the emulsion discharged from said nozzle for spreading the emulsion from said rod electrode and toward said sleeve electrode.

3. A combination as defined in claim 2 in which said means on said rod electrode includes a projection thereon providing an angled surface contacted by said stream of emulsion.

4. In combination in an electric treater for emulsions: an interstitial sleeve electrode; a rod electrode extending into said sleeve electrode and cooperating therewith in defining a treating space in which is established an electric field; and a diverging-stream nozzle directing a spreading non-rotating stream of emulsion into said treating space to spread from the vicinity of said rod electrode toward said interstitial sleeve electrode whereby emulsion particles are forced from said treating space through the interstices of said sleeve electrode.

5. In combination in an electric treater for an emulsion: a tank containing a dielectric liquid of higher dielectric strength than the emulsion to be treated; a sleeve electrode comprising a unitary metallic sleeve in said dielectric liquid; a rod electrode extending centrally in said sleeve electrode and cooperating therewith in defining a treating space in which is established an electric field; and a mixing device for introducing emulsion into said treating space and mixing same while in said treating space with said dielectric liquid, said mixing means including a diverging-stream nozzle directed into said treating space and delivering thereto a diverging stream of emulsion, said stream drawing dielectric liquid into the peripheral portion of said treating space, the diverging character of said stream mixing said emulsion with said dielectric liquid and moving emulsion particles outward to contact said sleeve electrode.

6. A method of electrically treating an emulsion by the use of an outer electrode structure positioned in a tank and surrounded by emulsion constituents in said tank and being open at its ends to communicate with said emulsion constituents at each end thereof, said outer electrode bounding a treating space, which method includes the steps of: establishing an electric field in said outer electrode structure; introducing into a central portion of said outer electrode structure in a direction along the central axis thereof and in spaced relation with said outer electrode structure a diverging non-rotating stream of emulsion which stream thus enters the central portion of said outer electrode structure, said stream spreading in sufficient degree to move emulsion particles into a position adjacent said outer electrode structure; and moving at least a portion of the treated emulsion from that end of said outer electrode structure toward which said stream of emulsion moves within said electrode structure.

7. A method of electrically treating an emulsion by the use of an outer electrode structure open at its ends, which method includes the steps of: establishing an electric field in said outer electrode structure; introducing into a central portion of said outer electrode structure at one end thereof and in a direction along the central axis thereof and in spaced relation with said outer electrode structure a diverging non-rotating stream of emulsion which stream spreads from said central axis in sufficient degree to move emulsion particles through said outer electrode structure whereby a portion of the emulsion constituents are removed sidewise from said field through said outer electrode structure; and removing the remaining emulsion constituents from the open end of said outer electrode structure opposite said one end into which the emulsion is introduced.

8. A method of electrically treating an emulsion by the use of an outer electrode structure positioned in a tank and surrounded by emulsion constituents in said tank and being open at its ends to communicate with said emulsion constituents at each end thereof, which method includes the steps of: establishing an electric field in said outer electrode structure; flowing axially into one end of said outer electrode structure and in spaced relation with said outer electrode structure a stream of emulsion which tends to flow through said outer electrode structure and from the other end thereof without spreading sufficiently to contact said outer electrode structure; spreading said stream of emulsion after it enters said one end of said outer electrode structure but before it leaves said other end of said outer electrode structure in sufficient degree to move emulsion particles from the normal path of said stream into a position contacting said outer electrode structure; and moving at least a portion of the treated emulsion from that end of said outer electrode structure toward which said stream of emulsion moves within said electrode structure.

9. In combination in an electric treater for emulsions: an outer electrode structure; means for establishing an electric field in said outer electrode structure; and a diverging-stream nozzle discharging centrally into said outer electrode structure a diverging stream of emulsion which spreads as soon as it is discharged from said nozzle, said stream of emulsion spreading toward said outer electrode structure in sufficient degree to contact same while in said electric field, said nozzle providing an orifice member with a peripherally-smooth restricted passage therethrough to discharge said stream of emulsion into said outer electrode structure.

10. A method of electrically treating an emulsion by use of an outer electrode structure positioned in a tank and surrounded by emulsion constituents in said tank and being open at its ends to communicate with said emulsion constituents at each end thereof and a small inner electrode centrally disposed in said outer electrode structure and cooperating therewith in defining an annular treating space, which method includes the steps of: establishing an electric field in said annular treating space which field is more concentrated adjacent said inner electrode than adjacent said outer electrode due to the concentric nature of said electrode structures; introducing into said field in spaced relation with said outer electrode structure a diverging non-rotating stream of emulsion coaxially with said central electrode which stream spreads from the axis of said outer electrode structure, the spreading of said stream being sufficient to move emulsion across said treating space and into contact with said outer electrode structure while said emulsion is in said electric field; and moving at least a portion of the treated emulsion from that end of said outer electrode structure toward which said stream of emulsion moves within said electrode structure.

ROBERT L. PETTEFER.